Jan. 17, 1939.      R. BUCHARDT      2,144,325
TUNING DIAL ARRANGEMENT
Filed Feb. 8, 1936

INVENTOR.
RAYMOND BUCHARDT
BY
ATTORNEY.

Patented Jan. 17, 1939

2,144,325

UNITED STATES PATENT OFFICE 2,144,325

TUNING DIAL ARRANGEMENT

Raymond Buchardt, Berlin, Germany, assignor to Telefunken Gesellschaft für Drahtlose Telegraphie m. b. H., Berlin, Germany, a corporation of Germany Application February 8, 1936, Serial No. 62,892
In Germany February 11, 1935

13 Claims. (Cl. 116—124.1)

In broadcast receiver sets with a large and finely subdivided continuous wave band, linear or accurate tuning dials occupy a good deal of space so that they are suitably replaced by some other kind of reading device, say, counters, etc. These, however, involve the drawback that always only a narrow section of the total wave band is visible, with the result that, in the attempt to tune to other waves or stations, these must be sought until they appear in the opening, while as a general rule it is desirable to make the whole scale or wave band visible in the window.

According to this invention, the dial is made spiral or helical with a plurality of convolutions upon its support, while the indicator or pointer means, in addition to the relative movement between it and the dial, undergoes a movement parallel to the axis of the helix or radially to the spiral line so that it will always slide over the scale.

A spiral dial moreover offers the advantage that in the case of a tuning condenser in which the plates are not of a shape directly proportional to the frequency (i. e., where the condenser is not a straight line condenser so-called) the wave range can be so placed and chosen that ready read-ability, desirable especially where the frequencies or wave-lengths are placed closely together, is insured by reading along the outer convolutions or spires, whereas in the sections or ranges where the frequencies are spread farther apart, the readings are taken in the inner convolutions so that a certain compensation is obtained.

Figure 1:
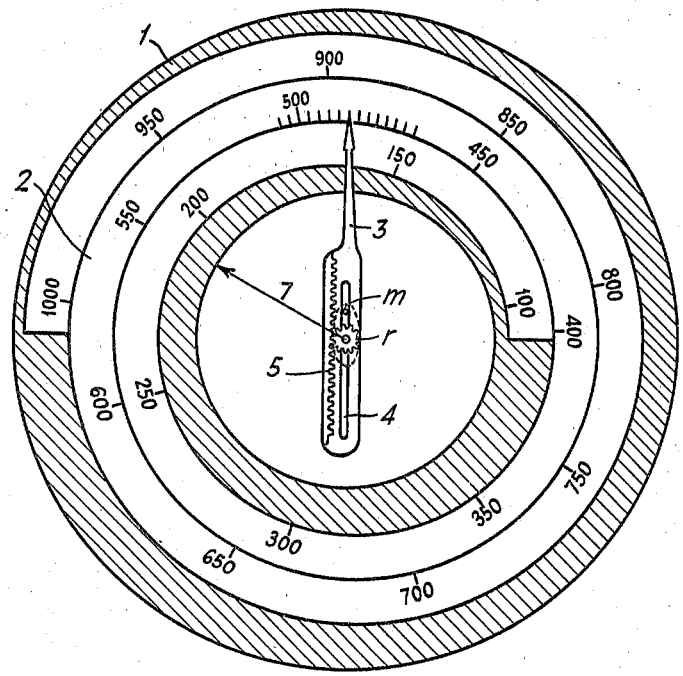
Figure 2:
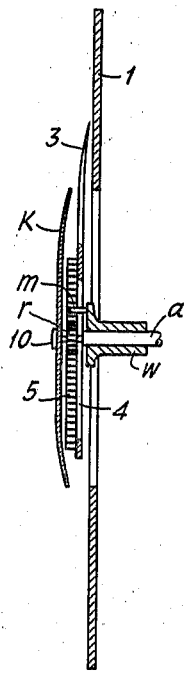
Figure 3:
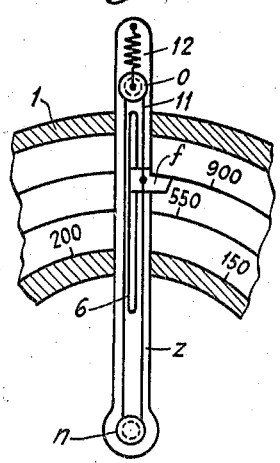
Figure 4:
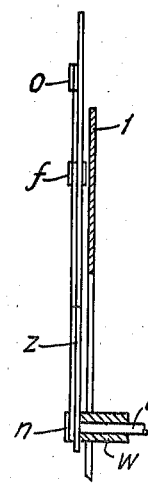

For a better understanding of the invention reference is made to the accompanying drawing in which, Fig. 1 is a front view of a tuning dial made according to the invention with the cover over the actuating gears removed, Fig. 2 is a partial cross section through the dial of Fig. 1 showing the cover plate in position, Fig. 3 is a front view of portion of the dial of Fig. 1 but showing a different type of actuating means for the index or pointer and, Fig. 4 is a partial cross section through the indicator of Fig. 3.

Referring to Fig. 1, I denotes the dial support upon which is mounted the dial 2 proper having the form of a spiral comprising over two convolutions or turns. The indicator consists of an arrow shaped member 3 which slides over the dial. Its driving mechanism consists of a small tooth wheel $r$ which is secured to a fixed spindle or pivot $a$ at the dial center. About the latter rotates the hollow pointer shaft $w$ which is driven by the tuning element by any suitable gearing not shown, the said pointer shaft $w$ supporting a pin or tappet $m$. The pointer, at the end opposite the arrow is provided with a rack rod 5. Parallel to the latter is a long slot 4 through which protrudes the spindle $a$ with the tooth-wheel $r$, pin $m$ fitting in slot 4. Upon turning the tuning means which results in rotation of the pointer shaft $w$ the pointer 3 is first turned by the pin $m$ and thereupon is shifted in radial direction by virtue of the co-action between the rack 5 and the wheel $r$. If care be taken so that the pitch periphery of the tooth-wheel $r$ is made equal to the pitch of the spiral scale or dial, it will be seen that the end of the pointer 3, as the shaft $w$ is revolved, will always shift along the spiral scale. The feed or motion mechanism of the pointer device may suitably be covered up or encased by means of a circular disk $k$ secured in front by means of a screw 10 in the stationary axis $a$.

Figs. 3 and 4 illustrate a similar scheme in which only the indicator or pointer means is of a different construction. Upon the pivot $a$ a cord pulley $n$ is disposed instead of the tooth-wheel $r$. The end of the pointer $z$ is fixedly seated upon the shaft $w$ and bears near its outer end another revoluble cord pulley $o$. Between the said two pulleys in the pointer stem, is a slot 6 in which the indicator means $f$, in the form of a slide or a window or frame is slidingly supported. The radial guiding of the said slide or window is accomplished by coupling the same with the central cord pulley $n$ through a cord 11. In order that the latter may always be tensioned, the cord pulley $o$ is disposed on a spring 12. Upon rotating the pointer shaft, by the travel of the cord, the reading window or indicator $f$ will be radially shifted along the stem of the pointer, and it is possible in this manner to make arrangements so that the window or the like will always follow and trace the convolutions of the spiral scale or dial.

The idea underlying the invention is not to be limited to the exemplified embodiments here illustrated, in fact, it is to comprise all possible modifications, including a dial arrangement in which the relative rotation between scale and pointer is effected by rotation of the dial support.

Another mode of accommodating a long scale within a comparatively limited area combined with convenience of reading would consist in arranging the dial spirally or helically upon a cylinder. But also in this instance, two relative movements are required between the dial and the pointer, namely, a relative movement of the indicator parallel to the axis of the helix, and a relative motion along the helical line. The latter suitably is effected by a rotation of the dial-bearing cylinder, and the former by a shift of the indicator means.

Another means to insure radial shifting of the pointer in combination with a spiral scale or dial would consist in conducting the indicator device by the aid of a groove or a collar or elevation on the support of the spiral dial. In this scheme it is by no means necessary that the said guide means should be placed directly adjacent the dial, in fact, it could be arranged, say, within the circle described by radius 7 (Fig. 1) so that the dial can be easily made and also be replaced.

Having described my invention, what I claim as new and desire to secure by Letters Patent is:

1. Means for indicating the position of a tuning device, comprising the combination of a spiral shaped graduated dial, a support, a pointer slidable on said support, means connected to said tuning device for rotating said pointer and circular gearing means interposed between said pointer and support arranged to move said pointer radially along said dial the pitch periphery of said gearing being equal to the distance between successive convolutions of said dial.

2. Means for indicating the position of a tuning device, comprising the combination of a spiral shaped graduated dial, a pointer having a slot therein, a support seated in said slot, a stationary gear mounted coaxially with said support, gear means on said pointer in engagement with said gear and a rotatable member connected to said tuning device and said pointer, whereby the end portion of said pointer moves adjacent said spiral shaped dial.

3. Means for indicating the position of a tuning device comprising the combination of a spiral shaped scale, a support, a stationary pulley mounted coaxial with said support, a hand mounted on said support, an indicator movable along said hand, and a flexible member passing over said pulley and connected to said indicator and said tuning device whereby rotation of said tuning device causes said indicator to move along said scale.

4. Means for indicating the position of a tuning device comprising the combination of a spiral shaped graduated dial, a pointer having a slot therein, a rotatable member connected to said tuning device and having a pin projecting into said slot, a rack arranged along one side of said slot on said pointer, a stationary shaft mounted within said rotatable member and a gear secured to said shaft in mesh with said rack, the pitch periphery of said gear being substantially equal to the pitch of said dial.

5. Means for indicating the position of a tuning device comprising the combination of a spiral shaped graduated dial, a hollow member connected to said tuning device and mounted centrally of said dial, a hand secured to said hollow member and having a radially arranged slot, a fixed shaft passing through said hollow member, a pulley secured to said shaft, a pointer having a guide portion entering said slot, and a flexible member secured to said pointer and having a portion wrapped around said pulley whereby rotation of said tuning device causes said pointer to move along said dial.

6. Radio tuning and indicating apparatus comprising adjustable radio tuning devices, a rotatable element connected with said devices and rotating at least one complete revolution with their adjustment, a fixed dial, a spiral tuning scale displayed upon said dial, an indicator-arm carried by said element and extending radially therefrom, and means acting to vary the radial extension of said indicator-arm as said element is rotated and cause the end-part of said indicator-arm to follow the spiral of said scale.

7. Radio tuning and indicating apparatus comprising adjustable radio tuning devices, a rotatable element connected with said devices and rotating at least one complete revolution with their adjustment, a fixed dial, a spiral tuning scale displayed upon said dial, a fixed element about which said rotatable element turns, an indicator-arm carried by said rotatable element and extending radially therefrom, and means including said rotatable and fixed elements acting to vary the radial extension of said indicator-arm as said rotatable element is rotated and cause the end-part of said indicator-arm to follow the spiral of said scale.

8. Radio tuning and indicating apparatus comprising adjustable radio tuning devices, a fixed shaft, an indicator-arm rotatably supported upon said shaft and extending radially therefrom, means connecting said indicator-arm with said devices acting to effect its rotation at least one complete revolution with their adjustment, and means connecting said indicator-arm with said shaft acting to vary the radial extension of said indicator-arm as it is rotated thereupon and cause the end-part of said indicator-arm to describe a spiral.

9. Radio tuning and indicating apparatus comprising adjustable radio tuning devices, a fixed shaft, an element rotatably supported upon said shaft and connected with said devices to rotate at least one complete revolution with their adjustment, an indicator-arm carried by said element and extending radially therefrom, and gearing connecting said indicator-arm with said shaft acting to vary the radial extension of said indicator-arm as it is rotated by said element and cause the end-part of said indicator-arm to describe a spiral.

10. Radio tuning and indicating apparatus comprising adjustable radio tuning devices, a fixed shaft and a fixed pinion-gear, an element rotatably supported upon said shaft and connected with said devices to rotate at least one complete revolution with their adjustment, an indicator-arm carried by said element and extending radially therefrom, and gearing connecting said indicator-arm with said pinion-gear acting to vary the radial extension of said indicator-arm as it is rotated by said element and cause the end-part of said indicator-arm to describe a spiral.

11. Radio tuning and indicating apparatus comprising adjustable radio tuning devices, a rotatable element connected with said devices and rotating at least one complete revolution with their adjustment, a fixed dial, a spiral tuning scale displayed upon said dial with the center of said scale coincident with the axis of rotation of said element, and indicator located adjacent said dial and connected for rotation with said element, and fixed means acting upon said indicator as it is rotated by said element to vary the distance of said indicator from the center of said scale and cause it to follow the spiral of said scale.

12. Radio tuning and indicating apparatus comprising adjustable radio tuning devices, a rotatable element connected with said devices and rotating at least one complete revolution with their adjustment, a tuning dial, a spiral scale displayed upon said dial with the center of said scale coincident with the axis of rotation of said element, and an indicator-arm extending radially with respect to said element and operatively connected therewith and having its free end-part located adjacent said dial; the connection of said indicator-arm with said element operating upon rotation of said element to vary the radial extension of said indicator-arm and cause the free end-part thereof to follow said spiral scale and cooperate therewith in indicating the adjustment of said devices.

13. Radio tuning and indicating apparatus comprising adjustable radio tuning devices, manually operable means, motion-transmitting mechanism operatively connecting said means with said devices, a shaft and a pinion-gear in fixed coaxial alinement, a sleeve comprised in said mechanism rotatably supported upon said shaft, a rack-bar slidably supported upon said sleeve and extending radially therefrom, the teeth of said rack-bar engaging said pinion, a tuning dial, a spiral scale displayed upon said dial with the center of said scale coincident with the axis of said shaft, and an indicator carried upon the free end of said rack-bar adjacent said dial and cooperating with said spiral scale to indicate the adjustment of said devices by said manually operable means.

RAYMOND BUCHARDT.